(12) United States Patent
Kuki et al.

(10) Patent No.: US 6,760,173 B2
(45) Date of Patent: Jul. 6, 2004

(54) SYNCHRONIZATION SERVO MARK DETECTOR AND METHOD HAVING IMPROVED PHASE ERROR IMMUNITY FOR USE IN MASS DATA STORAGE DEVICE, OR THE LIKE

(75) Inventors: Ryohei Kuki, Tokyo (JP); Isao Takigasaki, Matsudo (JP)

(73) Assignee: Texas Instruments Incorporation, Dallas, TX (US)

( * ) Notice: Subject to any disclaimer, the term of this patent is extended or adjusted under 35 U.S.C. 154(b) by 172 days.

(21) Appl. No.: 09/682,616

(22) Filed: Sep. 27, 2001

(65) Prior Publication Data

US 2003/0058562 A1 Mar. 27, 2003

(51) Int. Cl.[7] .................................................. G11B 5/09
(52) U.S. Cl. .................................... 360/51; 375/362
(58) Field of Search ................................ 360/51, 65, 46, 360/53, 39, 40, 41; 714/789; 341/68, 69, 94, 99, 98; 375/354, 362, 371, 263

(56) References Cited

U.S. PATENT DOCUMENTS 6,233,715 B1   5/2001   Kuki et al.

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A detector (55) and method for detecting a synchronization servo mark (SSM) in a data stream of mass data storage device (10) has a matched filter (56) to receive the data stream. The filter (56) produces a maximum output when the SSM is applied. A delay element receives (64) the matched filter output to produce a delay element output (72). When the delay element output (72) is greater than a predetermined threshold value ($V_{th}$) and is larger than the output value (74), the (SSM) is in a current time location. When the "D" element output (72) is greater than the predetermined threshold value ($V_{th}$) and less than the output value, the SSM is in the next time location. The threshold may be established to be less than maximum if the phase of the SSM is within a predetermined phase range.

40 Claims, 13 Drawing Sheets

SYNCHRONIZATION SERVO MARK DETECTOR AND METHOD HAVING IMPROVED PHASE ERROR IMMUNITY FOR USE IN MASS DATA STORAGE DEVICE, OR THE LIKE

BACKGROUND OF INVENTION

1. Field of Invention

This invention relates to improvements in methods and apparatuses for dynamic information storage or retrieval, and more particularly to improvements in methods and circuitry for detection of synchronization servo marks (SSMs), especially in information storage and retrieval systems that use a magnetic data storage medium.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Applications for hard disk drives are still being developed.

Mass data storage devices may also include optical disks in which the optical properties of a spinning disk are locally varied to provide a reflectivity gradient that can be detected by a laser transducer head, or the like. Optical disks may be used, for example, to contain data, music, or other information.

Typically in a hard disk drive, for example, a rotating storage disk may be formed of a suitable substrate material such as metal or glass onto which a thin film magnetic storage medium may be vacuum sputter deposited onto the disk. The disk has a central opening to enable a rotating hub to securely clamp the disk to a disk spindle. Synchronization servo data is imprinted by altering the magnetic domains on the disk in each sector of each track of the disk, usually following servo burst recorded thereon for head alignment along the track. As the head travels along the path of the track with which it is currently aligned, electrical signals are induced into the head by the magnetic flux recorded on the spinning disk. The electrical signals can then be processed in the read channel of the device to determine the instantaneous position of the head. One of the signals recorded onto the disk is a synchronization mark from which timing and other data retrieval activities can be based which must be detected before any such data retrieval activities can be commenced.

In the past, conventional synchronization servo mark (SSM) detection schemes detect a data stream from the head. The data stream contains the SSM, which must be identified. Previously, this was done by directly comparing the data stream to the known synchronization pattern to determine the number of bit matches and mismatches. If the value of the mismatched bits is less than a programmed error tolerance, the synchronization pattern is considered to have been found at that point.

Typically, the detection electronics of a hard disk drive is synchronous, and until the synchronization mark has been properly detected, some phase error may exist between the circuit clock and the synchronization servo mark. When the phase error is small enough, such pattern matching detection schemes show good performance. However, when the phase error is large (0.25 Tc), the detector cannot detect the synchronization mark data stream correctly. The use of a d=1 constraint synchronization mark pattern improves the phase immunity, but an ideal detector cannot recover the synchronization mark pattern correctly when a phase error approaching 0.5 Tc exists. Any delay that is experienced in the detection of the synchronization mark results in a decrease in system speed, which is undesirable.

What is needed is a method and detector for detecting the synchronization mark in a mass data storage device, or the like, that has a wider tolerance for such phase error so that the synchronization mark can be more rapidly and accurately detected.

SUMMARY OF INVENTION

In light of the above, therefore, it is an object of the invention to provide a method and detector for detecting the synchronization mark in a mass data storage device, or the like, that has a wider tolerance for such phase error so that the synchronization mark can be more rapidly and accurately detected.

One aspect of the invention derives from the notion that the synchronization servo mark (SSM) pattern itself does not need to be recovered correctly. The significant information is only the location of the SSM pattern. The SSM detector of the invention uses a single matched filter for detection of SSM location. The SSM pattern and the matched filter have been designed such as the output of the matched filter has the maximum value at the proper SSM location and has sufficiently small values at any other locations to avoid false synchronizations. The SSM can be detected by knowing the location with the maximum value of the matched filter output in the SSM detection window.

Thus, according to a broad aspect of the invention, a detector is presented for detecting the location of a synchronization mark in a data stream read from a recording medium of a mass data storage device. A matched filter is arranged to receive selected bit combinations of a received data sequence containing the synchronization mark shifting thereby, the matched filter being constructed to produce an output value that is of maximum magnitude when the synchronization mark has just shifted thereby in a next preceding time interval. A "D" element receives the output value from the matched filter to produce a "D" element output. When the "D" element output is greater or equal to a predetermined threshold value and is larger than the output value, the synchronization mark is in a current time location, and when the "D" element output is greater or equal to the predetermined threshold value and is less than or equal to the output value, the synchronization mark is in a next time location. The predetermined threshold value may be established to be less than the maximum magnitude if a phase of the synchronization mark is within a predetermined phase range.

The matched filter is matched to a corresponding synchronization servo mark, which is selected to produce the best signal-to-noise ratio with respect to the rest of the data that is contained in the data stream in which the synchronization servo mark is searched. In one embodiment, the synchronization servo mark is 30 bits long, and may be NRZI "101010001010101000101000100010".

According to another broad aspect of the invention, a detector is presented for detecting the occurrence of a synchronization mark in a data stream. The detector includes an input data delay element through which detected data containing the synchronization mark is clocked and an adder for receiving the data containing the synchronization mark and an output of the input data delay element to produce a summed output representing a sum of two consecutive data bits in the data stream. The summed output is successively clocked through a chain of data delay elements having a length of two less than a length of the synchronization mark. A filter is connected to receive at least some of the data from the chain of data delay elements the filter producing an output data stream. An output delay element receives the output data stream, and a first comparator compares an output of the delay element to a predetermined threshold value to produce a predetermined output state when the output of the output delay element is larger than the predetermined threshold value. A second comparator may be provided for comparing the output data stream to the output of the output delay element to produce a first predetermined output state when the output data stream is larger than the output of the output delay element and a second predetermined output state when the output data stream is smaller than the output of the output delay element.

According to yet another broad aspect of the invention, a method is presented for detecting the location of a synchronization mark in a data stream read from a recording medium of a mass data storage device. The method includes applying selected bit combinations of a shifting received data sequence containing the synchronization mark to a matched filter that produces an output value that is of maximum magnitude when the synchronization mark has just shifted thereby. The output value is delayed for one time period to produce a delayed value. Thus, when the delayed value is greater or equal to a predetermined threshold value and is larger than the output value, the synchronization mark is in a current time location. When the delayed value is greater or equal to the predetermined threshold value and is less than or equal to the output value, the synchronization mark is in a next time location.

According to yet another broad aspect of the invention, a mass data storage device is presented. The mass data storage device includes a data medium containing a synchronization mark contained thereon and a data transducer arranged to read data from the data medium, including the synchronization mark, to produce a data stream. A matched filter is arranged to receive selected bit combinations of the data stream, the matched filter being constructed to produce an output value that is of maximum magnitude when the synchronization mark has just shifted thereby in a next preceding time interval, and a "D" element for receiving the output value from the matched filter to produce a "D" element output. When the "D" element output is greater or equal to a predetermined threshold value and is larger than the output value, the synchronization mark is in a current time location. When the "D" element output is greater or equal to the predetermined threshold value and is less than or equal to the output value, the synchronization mark is in a next time location.

According to yet another broad aspect of the invention, a detector is presented for detecting the occurrence of a synchronization mark in a data stream. The detector includes a chain of data holding elements having a length as long as the synchronization mark and through which detected data containing the synchronization mark is successively clocked and a filter connected to receive at least some of the data in the data stream from the holding elements. The filter is configured to produce a maximum output when a desired synchronization mark is contained in the chain. A comparator receives the output to produce an output state when the sum is larger than a predetermined threshold value. The predetermined threshold value may be established to be less than the maximum sum if a phase of the synchronization mark is within a predetermined phase range.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
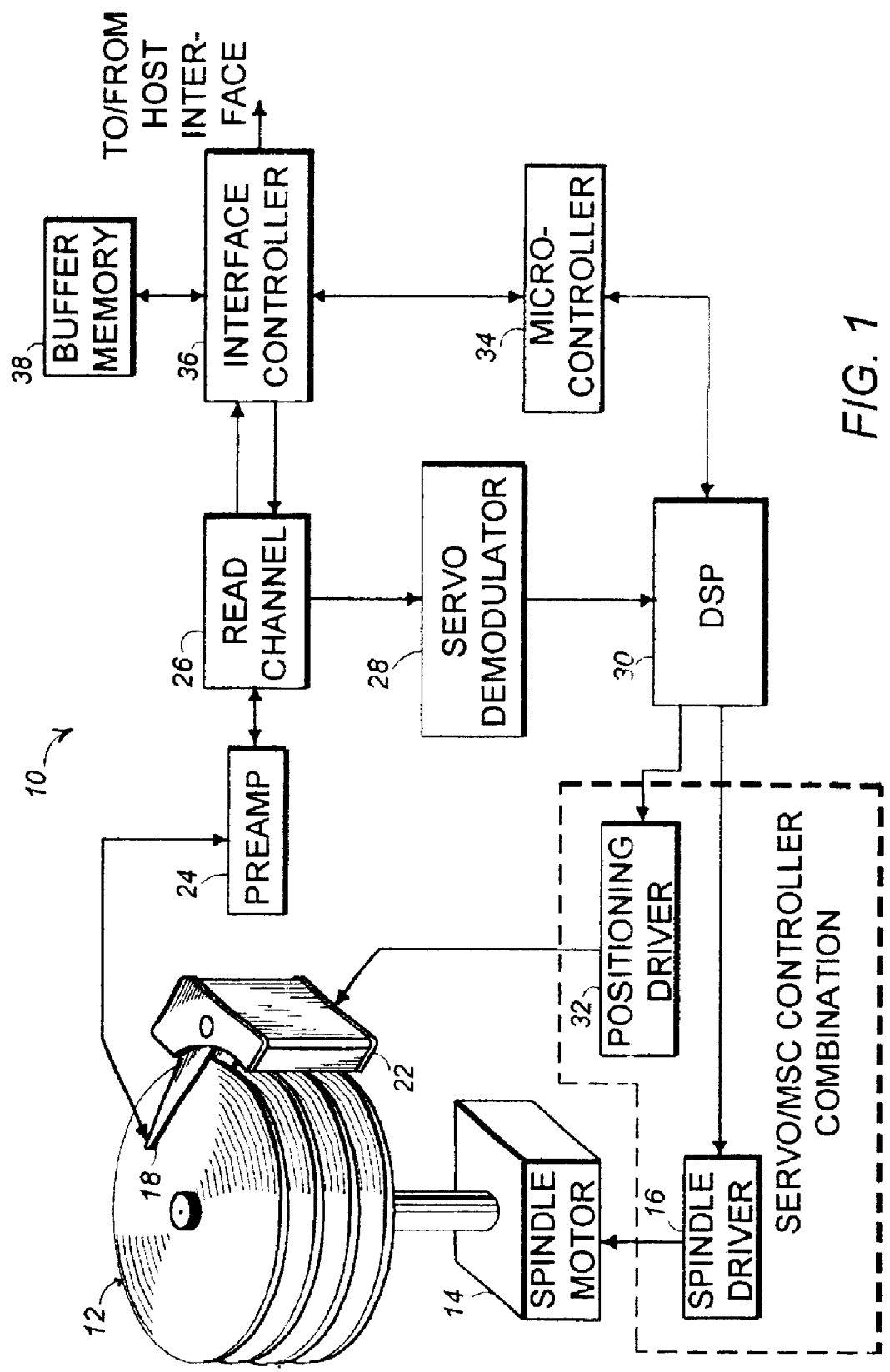
FIG. 1 illustrates a portion of a mass data storage device environment in which the present invention may be practiced.

FIG. 1 is a block diagram of a generic disk drive system 10, which represents the general environment in which the invention may be practiced. The system 10 includes a magnetic media disk 12 that is rotated by a spindle motor 14 and spindle driver circuit 16. A data transducer or head 18 is locatable along selectable radial tracks (not shown) of the disk 12 by a voice coil motor 22. The radial tracks may contain magnetic states that contain information about the tracks, such as track identification data, location information, synchronization data, synchronization servo marks (SSMs) as well as user data, and so forth. The head 18 is used both to record user data to and read user data back from the disk, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals are detected and demodulated by one or more servo demodulator circuits 28 and processed by a digital signal processor (DSP) 30 to control the position of the head 18 via a positioning driver circuit 32. The servo data that is read and processed may be analog data that is interpreted by a DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12.

As mentioned above, synchronization servo data is imprinted or recorded on the disk 12. As the head 18 travels along the path of the track with which it is currently aligned, electrical signals are induced into the head 18 by the magnetic flux recorded on the spinning disk 12. The electrical signals can then be processed in the read channel 26 of the device to determine the instantaneous position of the head 18. The synchronization mark enables timing and other data retrieval activities to be properly performed.

One aspect of the invention derives from the notion that the SSM pattern itself does not need to be recovered correctly. The significant information is only the location of the SSM pattern. According to a preferred embodiment of the invention, in contrast to the pattern matching techniques of the prior art, the invention uses a matched filter and threshold comparison to detect the occurrence of the SSM.

Using such threshold value techniques to determine the occurrence and location of an SSM, various methods may be employed. According to a first method, a search may be performed for the maximum value and the location in the SSM search window. If the detected maximum value is less than some predetermined threshold value, a missed synchronization will occur. (A missed synchronization is better than the false synchronization.) This first method is illustrated in the schematic diagram of a threshold-based detector 40 of FIG. 2, to which reference is now additionally made.

Figure 2:
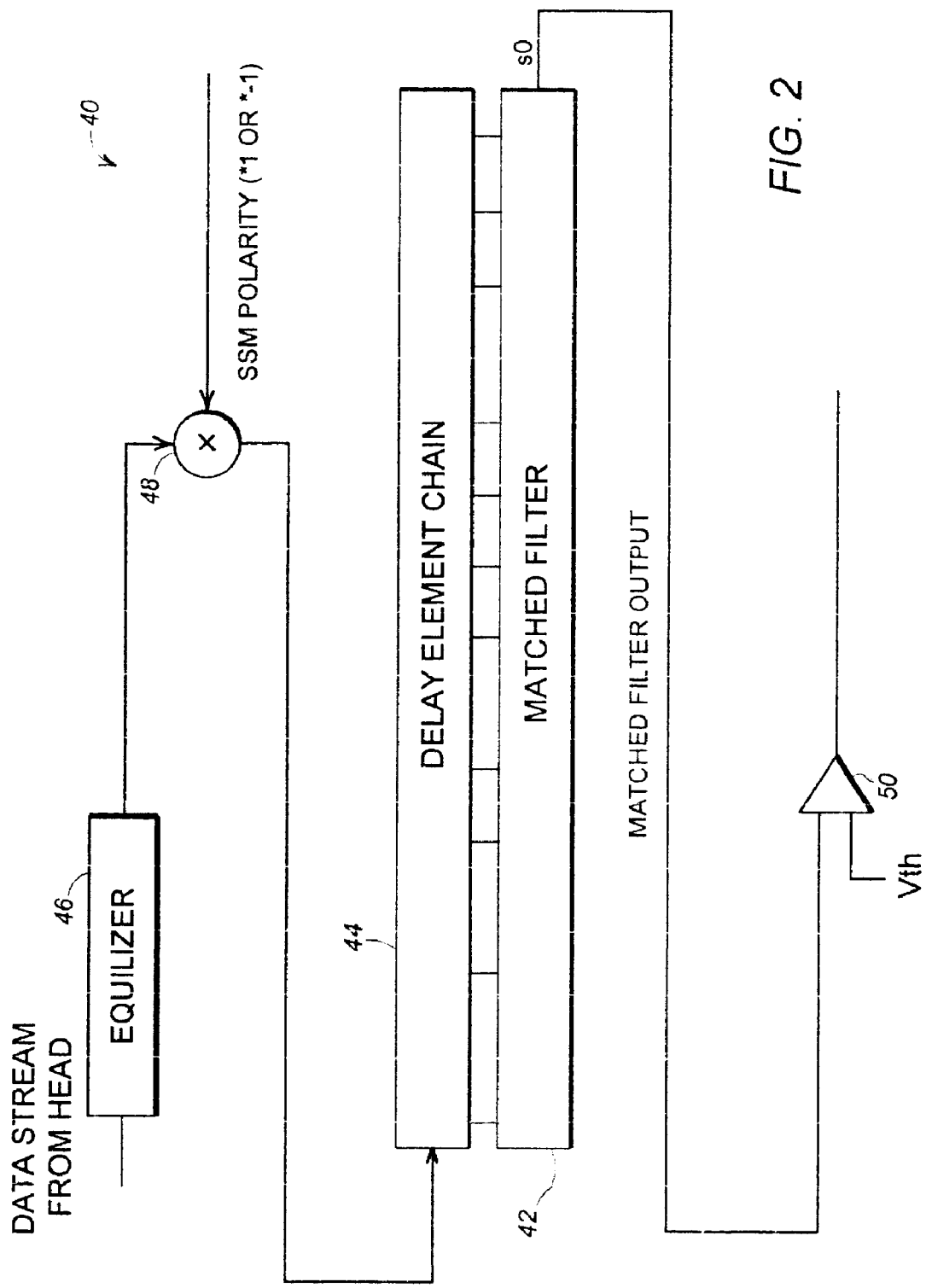
FIG. 2 is a block diagram of an SSM detector, in accordance with a preferred embodiment of the invention.

In FIG. 2, a threshold-based SSM detector 40 of the invention may be contained in the read channel circuitry 26. The SSM detector 40 uses a single matched filter 42 to detect the location of the SSM as is clocked thereby in a delay element chain 44. The delay element chain 44 may include a number of "D" elements, each of which applies a delay-transform to the string of equalized bits of the data stream from an equalizer 46, in known manner, as the data stream is sequentially shifted therethrough.

The SSM pattern and the matched filter have been designed such that the output of the matched filter 42 has the maximum value at the proper SSM location and has sufficiently small values at any other location to avoid false synchronization. Thus, the SSM can be detected by knowing the location with the maximum value of the matched filter output in the SSM detection window. Using the SSM pattern described in detail below, the matched filter output is:

$s_0 = y_0 + y_{-1} - y_{-4} - y_{-5} + y_{-8} + y_{-9} - y_{-10} - y_{-11} + y_{-14} + y_{-15} - y_{-16} - y_{-17} + y_{-18} + y_{-19} - y_{-20} - y_{-21} + y_{-24} + y_{-25} - y_{-26} - y_{-27} + y_{-28} + y_{-29}$.

More particularly, the data stream from the head 18 is equalized in an equalizer 46, preferably to a PR4 target, although those skilled in the art will recognize that other equalization techniques may be equally advantageously employed. The equalized signal is applied to the chain 44 of "D" elements. In the embodiment shown, the SSM is of length of 30 bit positions. Consequently, 30 "D" elements are employed.

Each "D" element applies a delay-transform to the string of equalized bits of the data stream, in known manner, as the data stream is sequentially shifted therethrough. If necessary, the sign of the data stream is adjusted by a multiplier 48, which multiplies each data bit by either +1 or 1, depending upon the desired processing polarity. The sign adjusted equalized data bits are then clocked sequentially through the chain of "D" elements 44, as shown.

More particularly, when the polarity of SSM pattern is "10-101000-1010-101000-101000-100010" (described below) the value of the output of the matched filter 42 is maximum at the proper SSM location. When the polarity of SSM pattern is reversed, the polarity of the matched filter input signal should be inverted by multiplying by −1. It should be noted that when the polarity of the SSM is +1, the polarity of the first gray code is −1.

As indicated, the matched filter is constructed to produce a maximum output value when the equalized data bits of the desired SSM pattern are contained in the chain 44 "D" elements. This is tested by a comparator 50, which receives the output of the matched filter 42, and compares it to a threshold value, $V_{th}$.

Since there may be some phase error in the detection of the equalized data bits with respect to the system clock, the threshold value, $V_{th}$, may be adjusted to a smaller value than the maximum value that is obtained when there is no phase error (0 Tc). The value selected for the threshold voltage, of course, must be larger than the maximum value expected from the encoded user data, which also may be sequentially passed through the decoder 40. Thus, the occurrence of the SSM may be detected throughout a wide range of phase errors.

According to a second method of the invention, the first location beyond threshold value may be detected. This detection scheme is simplest and does not have any latency for detection. Although this method has acceptable performance for seek-mode gray code detection, even if the detector detects the secondary value and the location, the secondary value can be regarded as the proper synchronization location because the gray code detector has ∀1 Tc error tolerance. But if the secondary value and the location is detected in track-mode gray code detection, good performance may be difficult to achieve. This can be accomplished using a portion of the below described circuit of FIG. 3.

Finally, to improve the problem of the second above described method, when a value beyond $V_{th}$ is detected, the current value is compared with the next value. When the current value is larger than the next value, it is regarded as the SSM detection. This detection scheme can detect the location with the maximum value, and shows good performance in track-mode gray code detection.

Figure 3:
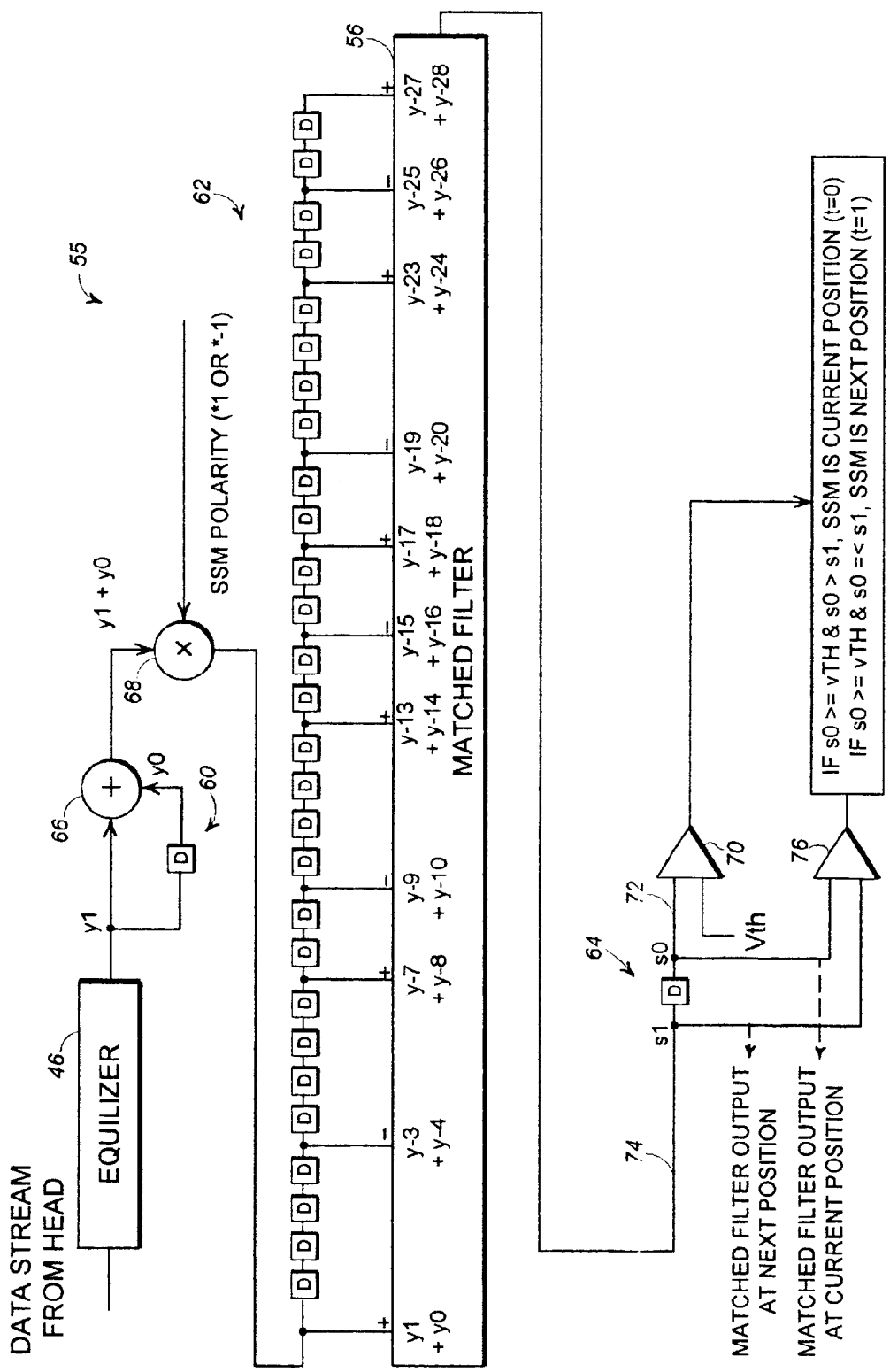
FIG. 3 is a block diagram of an SSM detector, in accordance with another preferred embodiment of the invention.

More particularly, a threshold-based SSM detector 55 of the invention, which is shown in FIG. 3, to which reference is now additionally made, may be contained in the read channel circuitry 26. The SSM detector 55 uses a single matched filter 56 to detect the location of the SSM. The SSM pattern and the matched filter have been designed such that the output of the matched filter 56 has the maximum value at the proper SSM location and has sufficiently small values at any other location to avoid false synchronization. Thus, the SSM can be detected by knowing the location with the maximum value of the matched filter output in the SSM detection window. Using the SSM pattern described in detail below, the matched filter output (including the "D" element 64) is:

$s_0 = y_0 + y_{-1} - y_{-4} - y_{-5} + y_{-8} + y_{-9} - y_{-10} - y_{-11} + y_{-14} + y_{-15} - y_{-16} - y_{-17} + y_{-18} + y_{-19} - y_{-20} - y_{-21} + y_{-24} + y_{-25} - y_{-26} - y_{-27} + y_{-28} + y_{-29}.$

The data stream from the head 18 is equalized in the equalizer 46. Preferably the data is equalized to a PR4 target, although those skilled in the art will recognize that other equalization techniques may be equally advantageously employed. The equalized signal is applied to a chain of "D" elements 60 and 62. The output of the matched filter 56 is applied to a "D" element 64. In the embodiment shown, the SSM is of length of 30 bit positions. Consequently, 30 "D" elements are employed.

Each "D" element applies a delay-transform to the string of equalized bits of the data stream, in known manner, as the data stream is sequentially shifted therethrough. Thus, the output from the equalizer 46 represents the current equalized data bit, y1. The output from the equalizer 46 is applied to "D" element 60 the output of which is added to the current equalized data bit by an adder 66. Therefore, the output from the adder 66 represents the sum of the current equalized data bit and the previous equalized data bit, y0. If necessary, the sign of the data stream is adjusted by a multiplier 68, which multiplies each data bit by either +1 or 1, depending upon the desired processing polarity. The sign adjusted equalized data bits are then clocked sequentially in to "D" elements 62, as shown.

More particularly, when the polarity of SSM pattern is "10-101000-1010-101000-101000-100010" (described below) the value of the output of the matched filter 56 is 22 at the proper SSM location. When the polarity of SSM pattern is reversed, the polarity of the matched filter input signal should be inverted by multiplying by −1. It should be noted that when the polarity of the SSM is +1, the polarity of the first gray code is −1.

The $y_0+y_1$ sum and elected "D" element outputs are applied to inputs of the matched filter 56 with appropriate signs to produce the desired transfer function of the filter. Thus, the $y_0+y_1$ sum and outputs of "D" elements $y_{-4}$, $y_{-8}$, $y_{-10}$, $y_{-14}$, $y_{-16}$, $y_{-18}$, $y_{-20}$, $y_{-24}$, $y_{-26}$, and $y_{-28}$ are respectively added and subtracted into the matched filter 42, as shown. As indicated, the matched filter is constructed to produce a maximum output value when the equalized data bits of the desired SSM pattern are contained in the "D" elements 60 and 62. This is tested by a comparator 70, which receives the output of "D" element 64 on line 72, and compares it to a threshold value, $V_{th}$.

It is noted that the input 74 to the "D" element 64 represents the matched filter output of the next data position, s1, and the output of the "D" element 64 represents the matched filter output at the current data position, s0. A second comparator 76 compares the values at the next and current data positions. If the output values of the comparators 70 and 76 determine that the current data position is greater or equal to the threshold voltage, and that the current data position is greater than the next data position, then the SSM is at the current position, (i.e., t=0). On the other hand, if the values of the comparators 70 and 76 determine that the current data position is greater or equal to the threshold voltage, and that the current data position is less than or equal to the next data position, then the SSM is at the next position, (i.e., t=1).

Since there may be some phase error in the detection of the equalized data bits with respect to the system clock, the threshold value, $V_{th}$, may be adjusted to a smaller value than the maximum value that is obtained when there is no phase error (0 Tc). The value selected for the threshold voltage, of course, must be larger than the maximum value expected from the encoded user data, which also may be sequentially passed through the decoder 55. As will become apparent, the maximum value of the output of the matched filter 22, with the particular SSM pattern selected, will be 22. Programmable values of $V_{th}$ of 9–13, for example of 0.5 or 1 step increments may be provided to assist in the design.

Thus, the occurrence of the SSM may be detected throughout a wide range of phase errors, up to and including ±0.5 Tc. ±0.5 Tc phase immunity is generally regarded as being enough for an SSM detector, because any value of phase error larger than ±0.5 Tc is reduced to a value within the range of ±0.5 Tc in SSM detection. For example, a phase error of ±0.7 Tc is equivalent to a phase error of 0.3 Tc, which is within the ±0.5 Tc range. If the phase error is constant, the SSM detector with ±0.5 Tc noise immunity can detect the SSM in any starting phase.

The selection of the SSM pattern may be performed, for example, by a computer search of the possible patterns that produce the largest difference between the output of the matched filter at the proper SSM pattern position and other positions in the data stream. In other words, the signal-to-noise (SNR) performance of SSM detection is required to be better than that of the gray code detection. By applying a constraint to the SSM pattern of d=odd No, the servo pattern write frequency can be half. Furthermore, for a ⅙ gray code of tracking mode, a minimum 26-bit SSM length is required. As a result, the computer search may be performed by reviewing SSM patterns in the range of 20–30 bits.

Although a number of SSM patterns may be used, it has been determined that the following signed NRZI patterns with suppressed even zeros produce the best signal-to-noise ratio with regard to a ⅙ gray code in the presence of additive white Gaussian noise:

1-1010-101-11-101-11
1-110-1010-11-110-11
1-110-11-110-101-101
1-110-11-110-110-101
1-110-11-11-1010-101
1-11-101-11-1010-101
1-110-11-11-101-101-1, which all have a signal-to-noise ratio of about 1.6432.

The following 30-bit pattern, for example, may be selected from the computer generated candidates of 30-bit patterns: "101010001010101000101000100010" NRZI, the fourth pattern listed above. This pattern forms the basis of the example illustrated herein.

Figure 4:
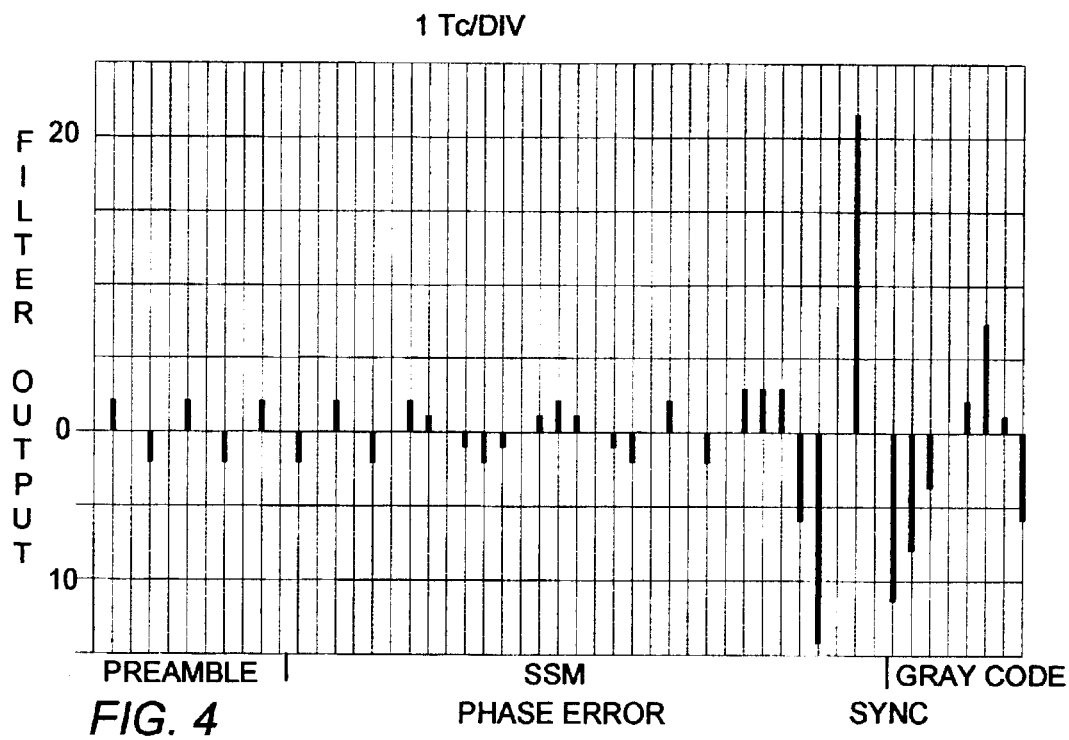
FIG. 4 is a graph showing a simulated matched filter output using a selected 30-bit pattern and circuit, in accordance with a preferred embodiment of the invention.

Using the selected 30-bit pattern and circuit described above, a graph of simulated matched filter output vs. phase error is shown in FIG. 4, to which reference is now additionally made. In the graph of FIG. 4, it is assumed that the SSM pattern has no phase and no equalizer errors and is substantially noiseless. It can be sent that the output of the matched filter 56 has a value of 22 at the proper SSM position, has a maximum value of 2 in the preamble, has a maximum value of 4 in the SSM, and has a maximum value of 8 in the gray code region. Thus, the maximum output of the matched filter 56, except at the proper location, is 8. Therefore, even the worst case gray code can be located. Although "late synchronization" may occur in some of the worst-case gray code scenarios, late synchronization occurs only after missing proper synchronization, and has a small likelihood of occurring.

In FIG. 4, the signed NRZI data patterns used are:
10-1010-1010-1010-1010-1010-1010-1010-1010-1010-10 (preamble)
10-101000-1010-101000-101000-100010 (SSM)
00–100000 (gray code).

The matched filter input, which preferably is an equalized PR4 signal, when phase shift=0 is:
-111-1-111-1-111-1-111-1-111-1-111-1-111-1-111-1-111-1-111-1-1 (preamble)
11-1-11100-1-111-1-11100-1-11100-1-10011 (SSM)
00-1-10000 (gray code).

Figure 5:
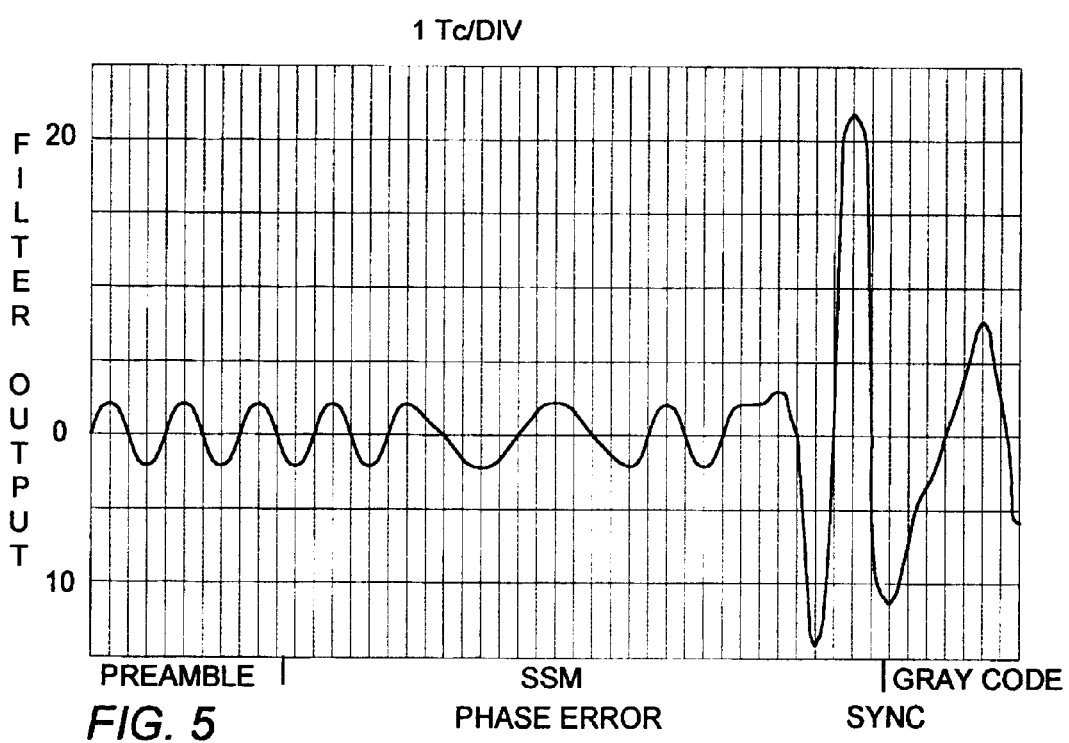
FIG. 5 is a graph showing a simulated matched filter output at various starting phases, in accordance with a preferred embodiment of the invention.

The simulated output of the matched filter 56 at various starting phases is shown in the graph of the output of the matched filter 56 vs. phase error in FIG. 5, to which reference is now additionally made. Again, it is assumed that there is no equalizer error, and that the pulses are substantially noiseless and Lorentzian. FIG. 5 demonstrates that the phase error does not increase false (both early and late) synchronization.

Figure 6:
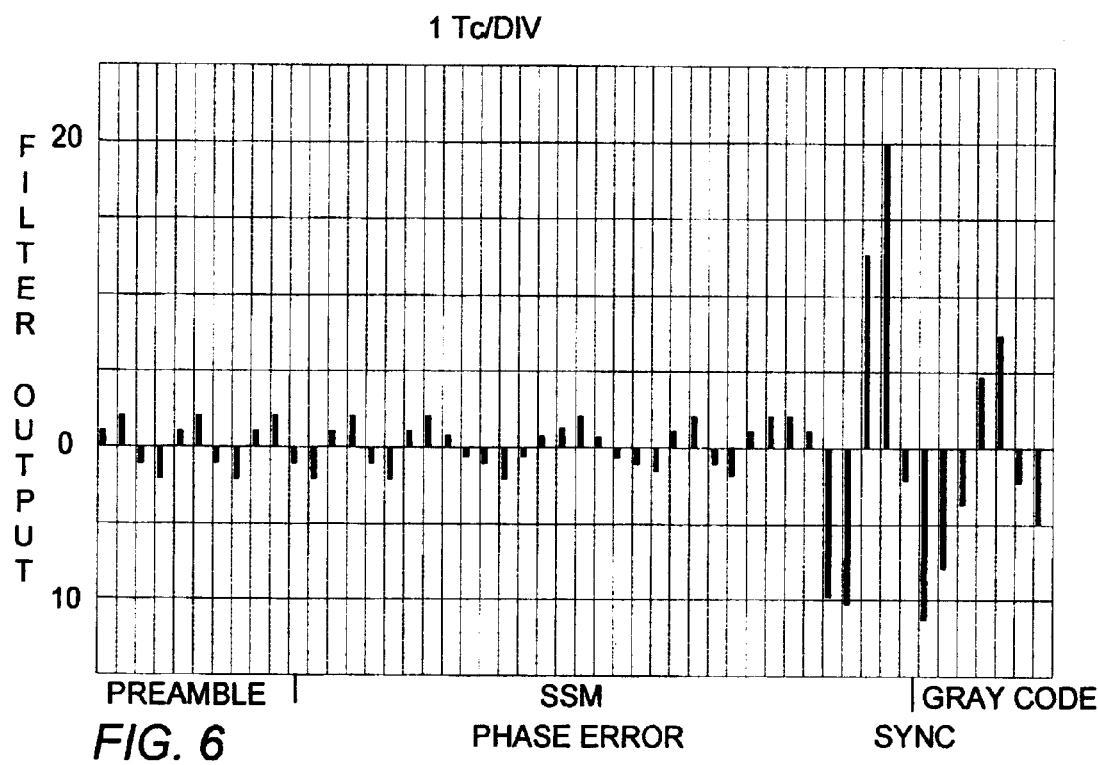
FIGS. 6–8 are graphs of matched filter output vs. time, respectively at phase shifts of −0.3 Tc, +0.3 Tc and ±0.5 Tc, in accordance with a preferred embodiment of the invention.
Figure 7:
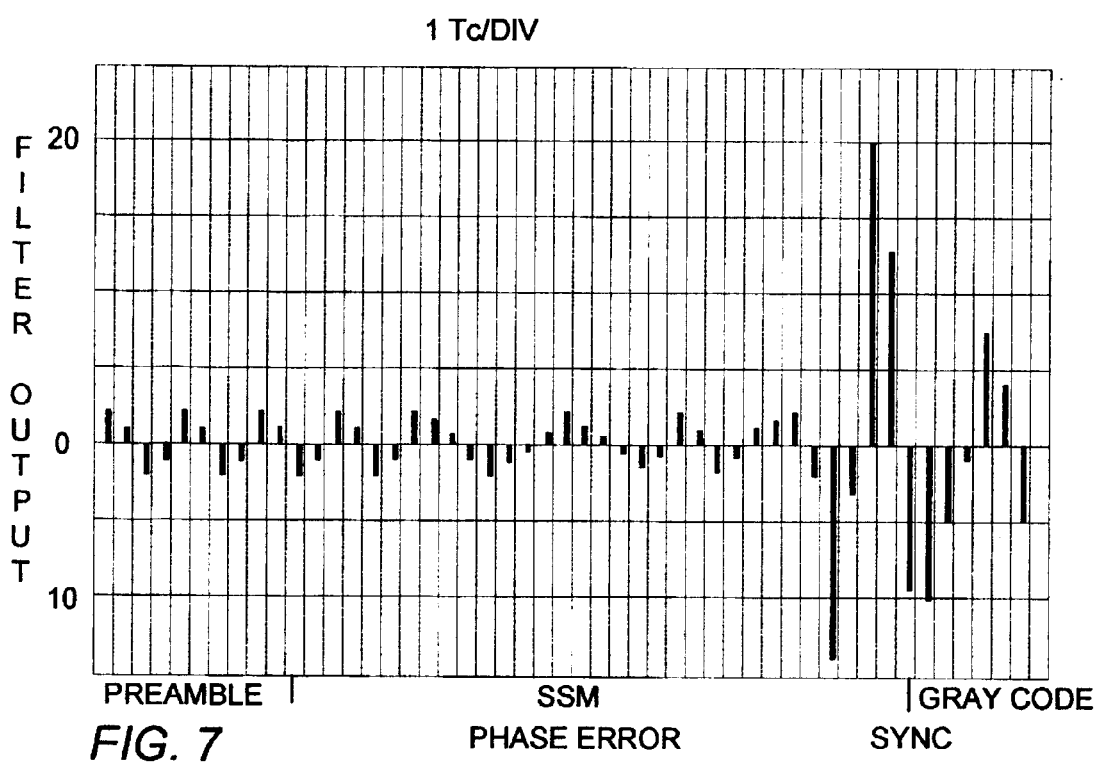
Figure 8:
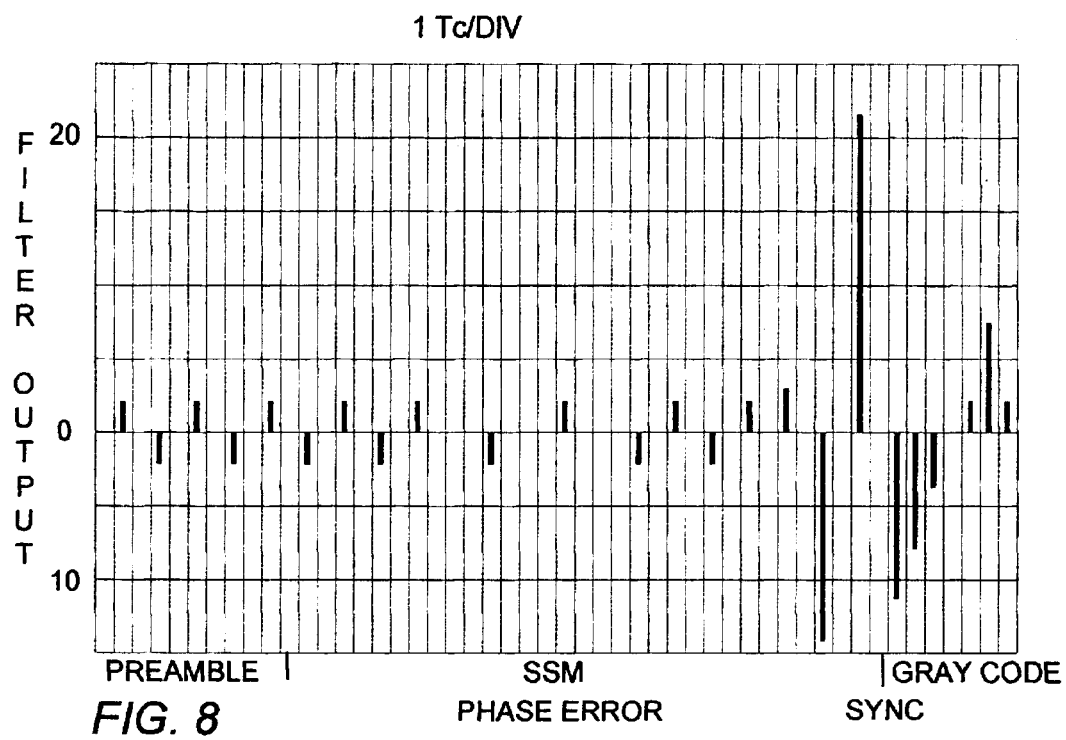

FIGS. 6–8 are graphs of the output of the matched filter 56 vs. phase error illustrating the output of the matched filter 56 at −0.3 Tc, +0.3 Tc and ±0.5 Tc phase shifts, respectively. It can be seen that when the phase shift is −0.3 Tc, the secondary large value appears at the location of +0.7 Tc. When the phase shift is +0.3 Tc, the secondary large value appears at −0.7 Tc. When the phase shift is −0.5 Tc or ±0.5 Tc, the almost same values appear at +0.5 Tc and −0.5 Tc. In any phase error, the largest value appears within −0.5 Tc to +0.5 Tc, and the next largest value appears within +0.5 Tc to +1 Tc or within −0.5 Tc to −1 Tc.

Figure 9:
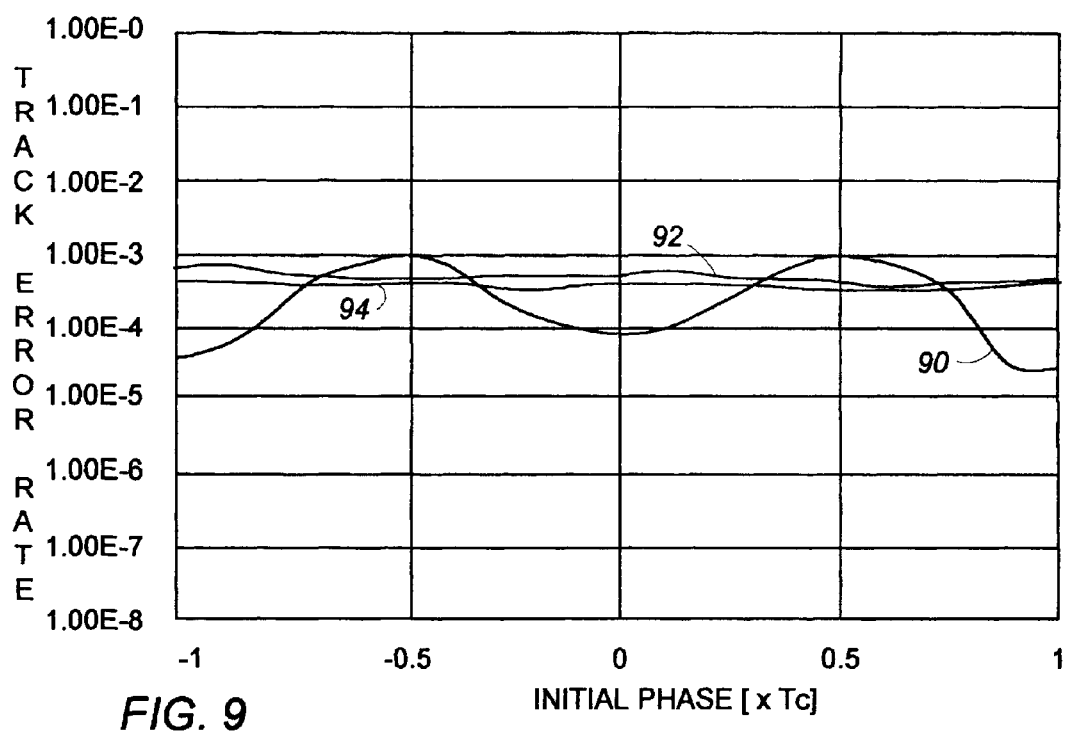
FIG. 9 is a graph of track error rate vs. initial phase, showing an example of simulation and calculation results for the SSM detector of the invention.

FIG. 9 is a graph of track error rate vs. initial phase, showing an example of simulation and calculation results for the SSM detector of the invention. The calculation results are shown by line 94. The false SSM rate is shown by line 92, and the miss SSM rate is shown by the line 90. Under the very worse SNR (8 dB) and ±1 Tc phase shift conditions, the SSM can be detected.

Figure 10:
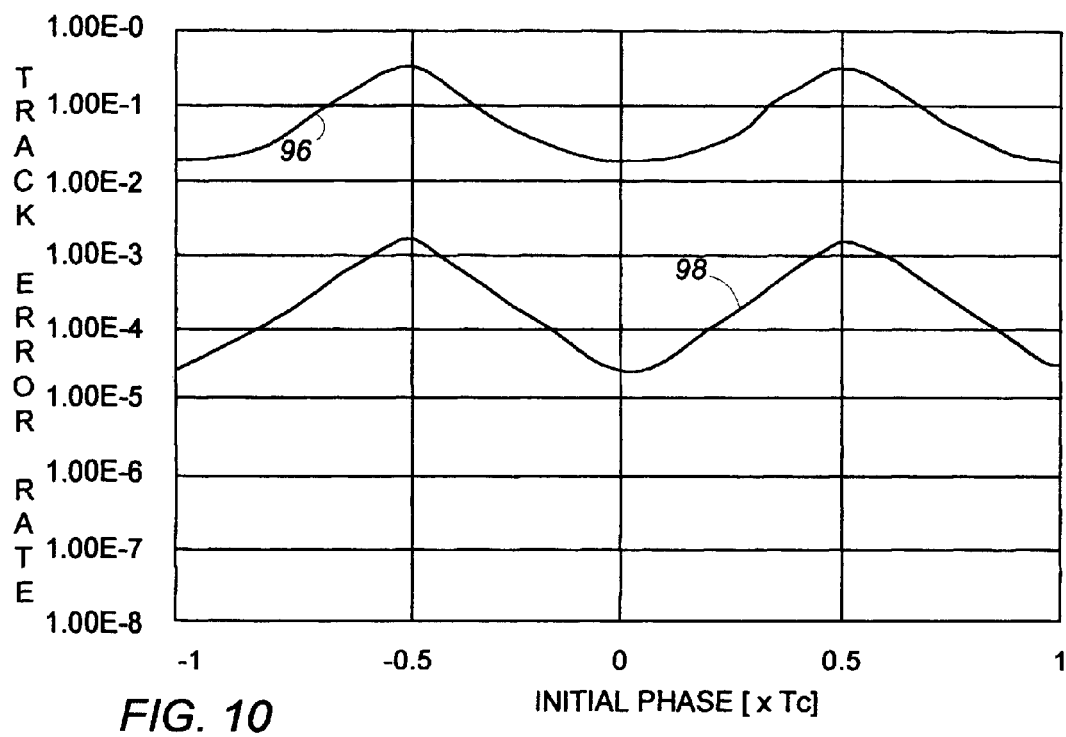
FIG. 10 is a graph of track error rate vs. initial phase, showing an example of simulation and calculation results for the total error rate of the SSM detector of the invention using a ⅙ gray code in both seek-mode and track-mode.

FIG. 10 is a graph of track error rate vs. initial phase, showing an example of simulation and calculation results for the total error rate of the SSM detector of the invention using a ⅙ gray code in both seek-mode and track-mode. Seek mode is shown by curve 96, and track mode is shown by curve 98. The performance of track error rate is cyclic in the 1 Tc period. The worst error rates occur at −1.5, −0.5, +5, +1.5, . . . This performance depends on the performance of the gray code.

Figure 11:
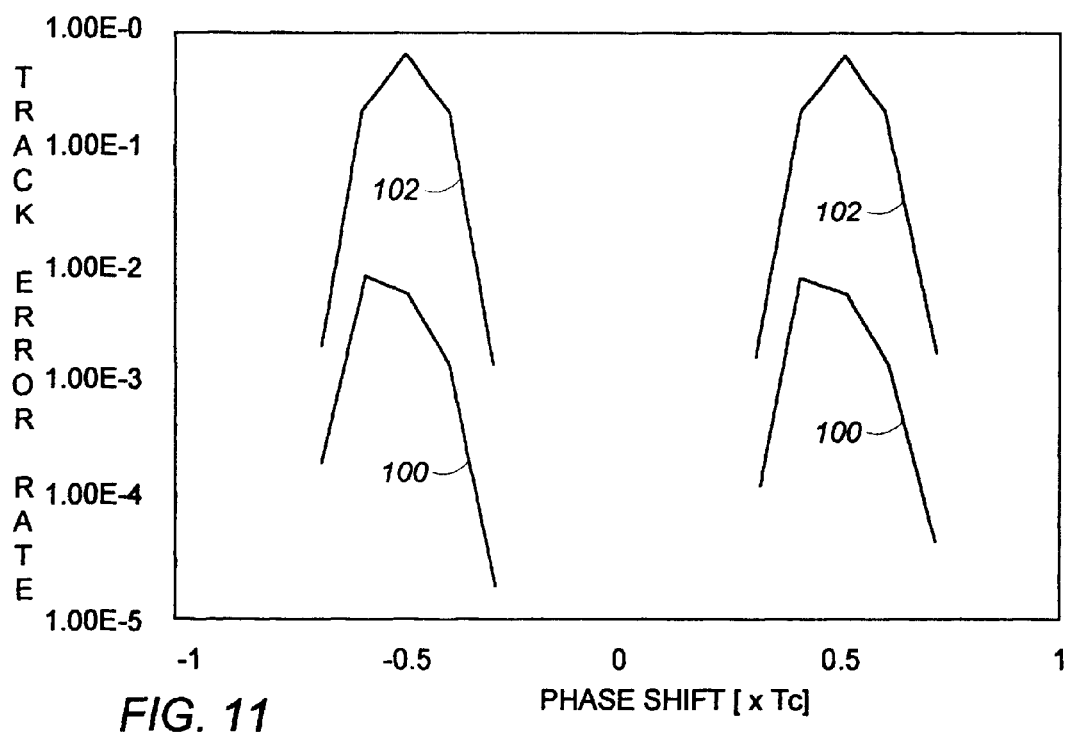
FIG. 11 is a graph of track error rate vs. initial phase, showing simulation results for a 30 bit-SSM detector with framing.

FIG. 11 is a graph of track error rate vs. initial phase, showing simulation results for a 30 bit-SSM detector with framing. Curves 100 represent the false SSM, and curves 102 represent both missed SSM and SSM+gray code. The SSM cannot be detected around −0.5 Tc and around +0.5 Tc. When the phase shift is larger than 0.3 Tc, the overall track error rate (SSM+gray code) is controlled by the SSM error rate.

Figure 12:
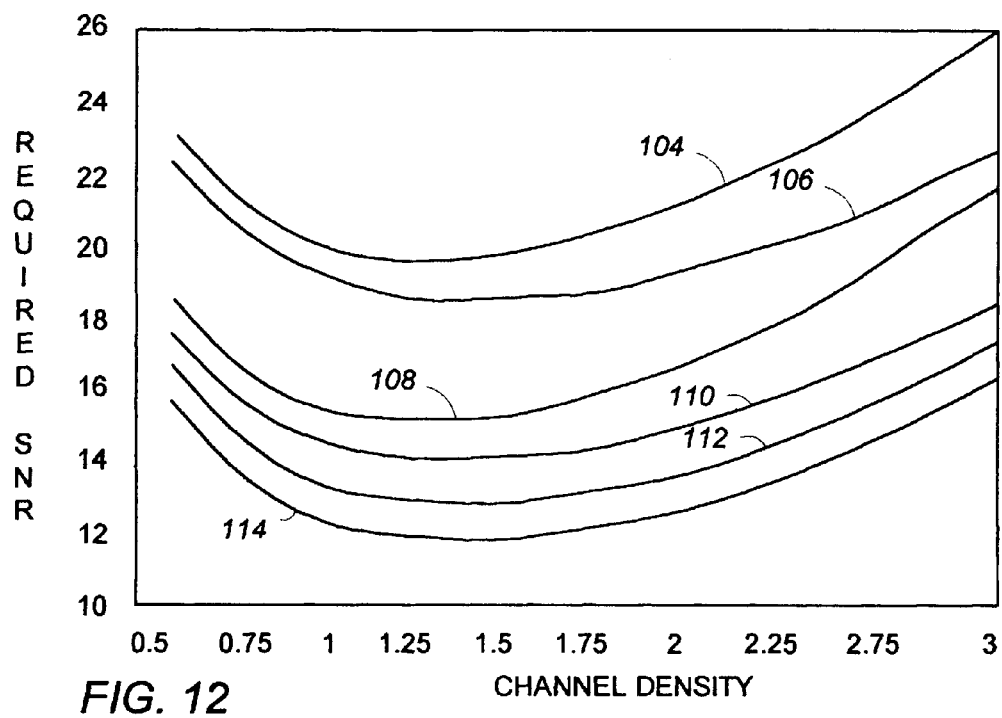
FIG. 12 is a graph of channel density dependence of the SSM detector of the invention at 0 phase shift.

FIG. 12 is a graph of channel density dependence of the SSM detector of the invention at zero phase shift. Curve 104 represents ¼ gray code in track mode, and curve 106 represents ¼ gray code in seek mode. Curve 108 represents ⅙ gray code in track mode, and curve 110 represents ⅙ gray code in seek mode. Curve 112 represents the SSM with $V_{th}$=11, curve 114 represents the SSM with $V_{th}$=12. The SSM detector has better performance than the gray code detectors in all ranges of channel density.

Figure 13:
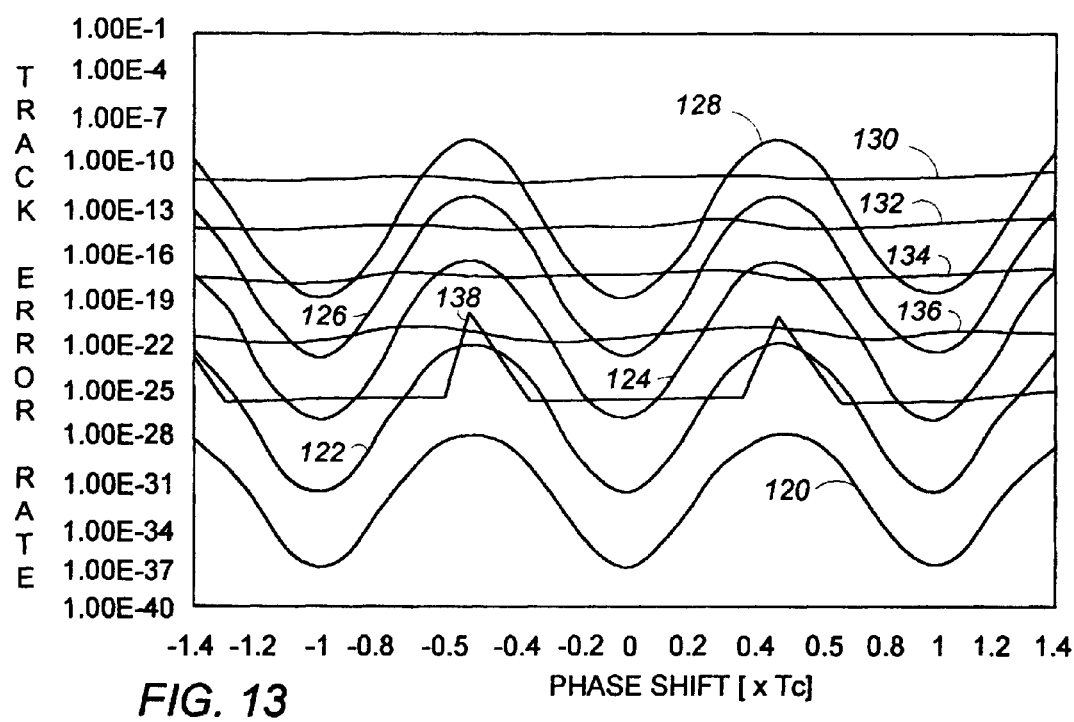
FIG. 13 is a graph of SSM error rate vs. the $V_{th}$ of the detector of the invention.

FIG. 13 is a graph of SSM error rate vs. the $V_{th}$ of the detector. Curve 120 represents a false SSM with $V_{th}$=9. Curve 122 represents a false SSM with $V_{th}$=10. Curve 124 represents a false SSM with $V_{th}$=11. Curve 126 represents a false SSM with $V_{th}$=12. Curve 128 represents a false SSM with $V_{th}$=13. Curve 130 represents a missed SSM with $V_{th}$=9. Curve 132 represents a missed SSM with $V_{th}$=10. Curve 134 represents a missed SSM with $V_{th}$=11. Curve 136 represents a missed SSM with $V_{th}$=12. Curve 138 represents a missed SSM with $V_{th}$=13. Thus, a larger $V_{th}$ decreases the false synchronizations, but increases the missed synchronizations. The false synchronizations hardly depend on the phase shift.

Figure 14:
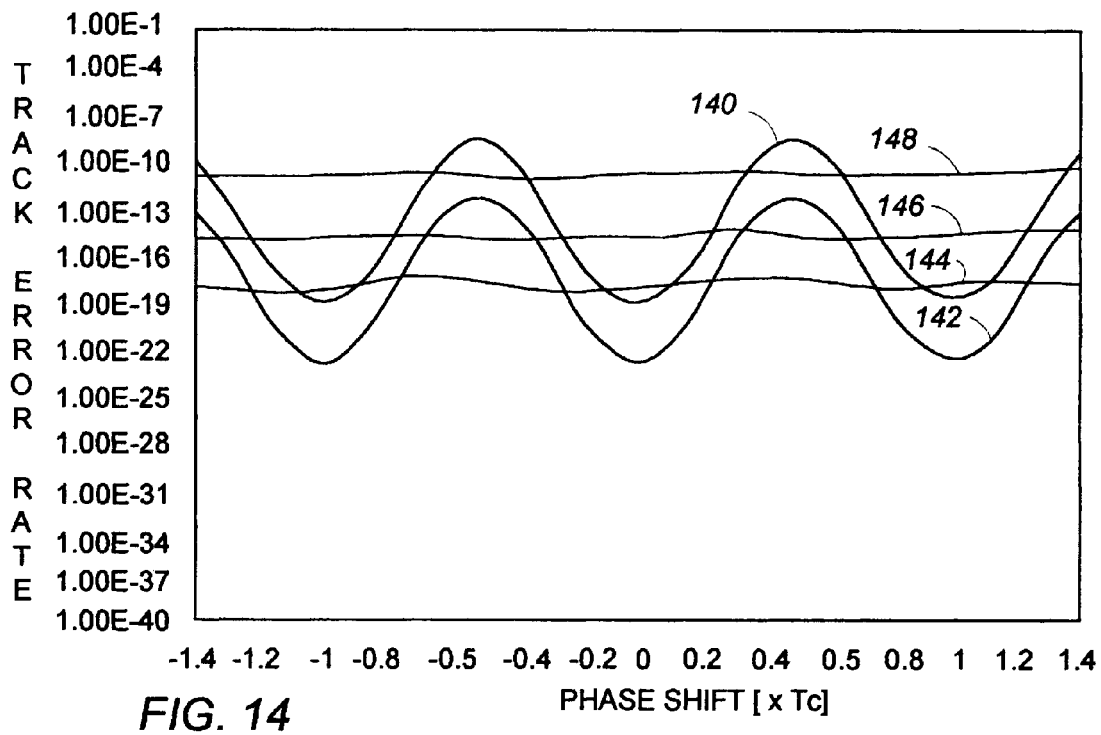
FIG. 14 shows a graph of the total SSM error rate (false and missed) vs. $V_{th}$ for the detector of the invention.

FIG. 14 is a graph of the total SSM track error rate (false and missed) vs. $V_{th}$. Curve 140 shows the track error rate at $V_{th}$=13. Curve 142 shows the track error rate at $V_{th}$=12. Curve 144 shows the track error rate at $V_{th}$=11. Curve 146 shows the track error rate at $V_{th}$=10. Curve 148 shows the track error rate at $V_{th}$=9. $V_{th}$=12 is best at phase shift=0, and $V_{th}$=11 is best in the existence of phase shift.

Figure 15:
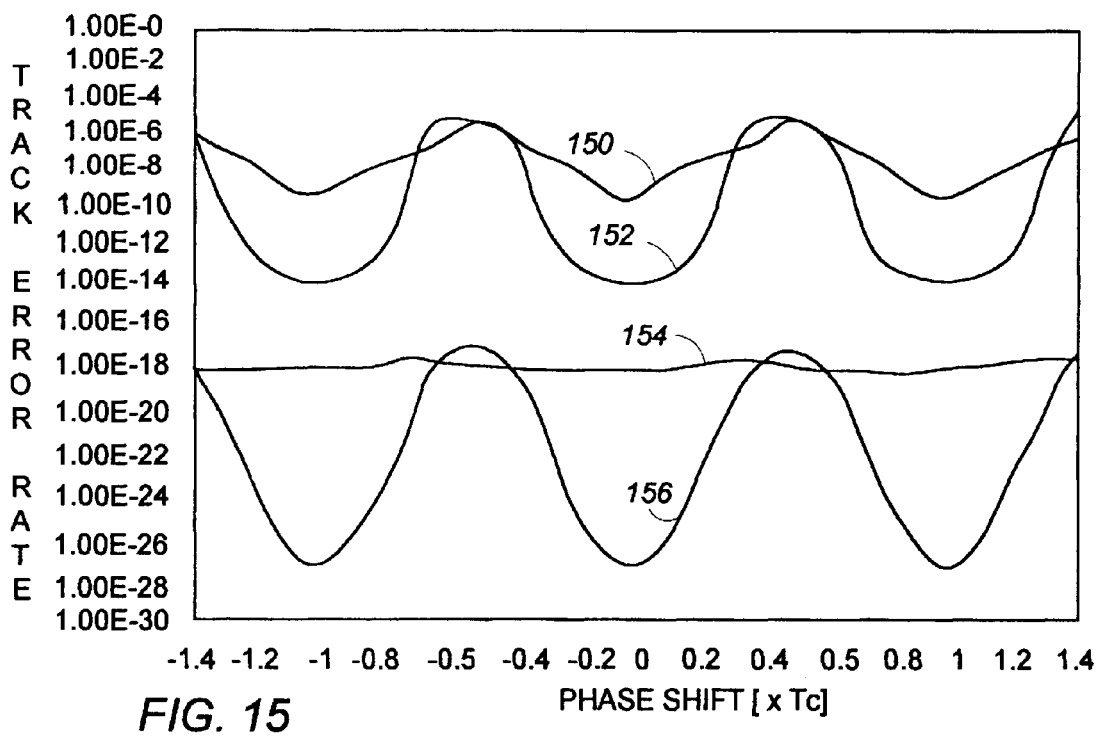
FIG. 15 shows a graph of overall error rate of SSM+⅙ gray code for the detector of the invention.

FIG. 15 is a graph of overall error rate of SSM+⅙ gray code. Curve 150 represents SSM+⅙ gray code in seek mode. Curve 152 represents SSM+⅙ gray code in track mode. Curve 154 represents SSM false sync. Curve 156 represents SSM missed sync. Track-mode gray code is better than seek-mode gray code. The current simulations and calculations were done in the constant phase shift condition. The seek mode gray code with ±1 Tc phase tolerance must be better in the existence of time varying phase shift caused by servo track writer or motor speed variations.

Figure 16:
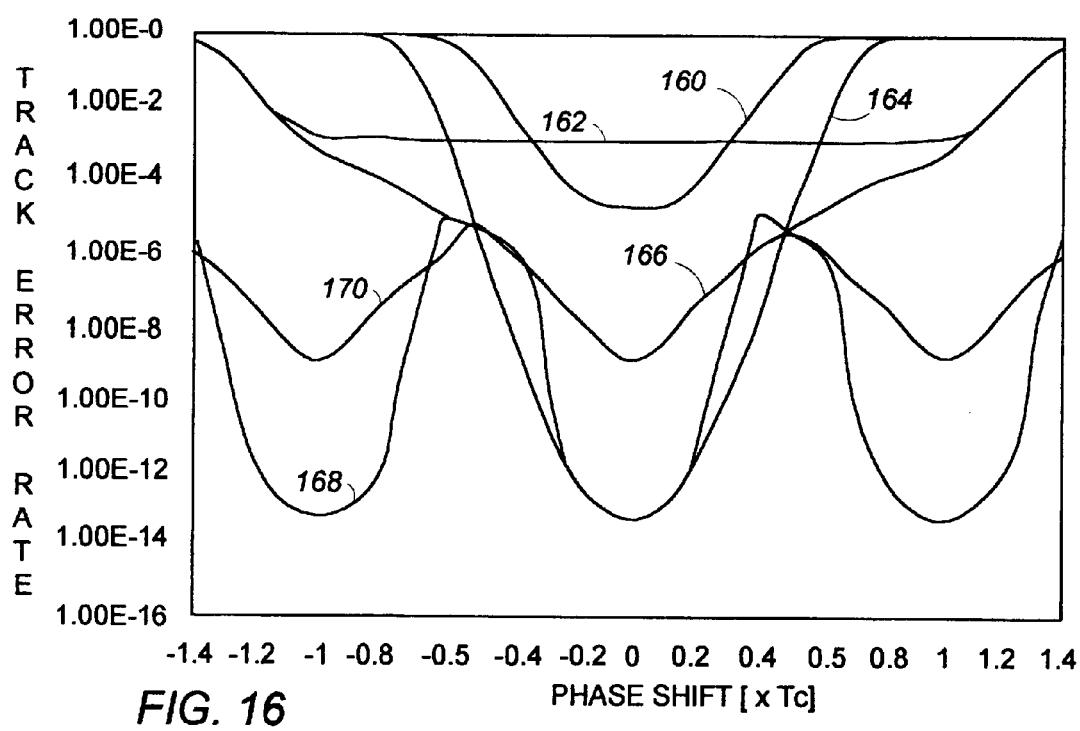
FIG. 16 is a graph of track error rate vs. phase shift, illustrating comparisons of "SSM+⅙ gray code" with "gray code only."

FIG. 16 is a graph of track error rate vs. phase shift, illustrating comparisons of "SSM+⅙ gray code" with "gray code only." Curves 160 and 162 represent respectively the track rate vs. phase shift for ¼ gray code in track and seek modes. Curves 164 and 166 represent respectively the track rate vs. phase shift for ⅙ gray code in track and seek modes. Curves 168 and 170 represent respectively the track rate vs. phase shift for the SSM+⅙ gray code in track and seek modes. The SSM+⅙ gray code has better performance in any phase than the ¼ gray code in zero phase. This result shows that the combination of the SSM of the present invention and ⅙ gray code has the possibility of asynchronous gray code detection with fairly good performance, without over sampling.

Figure 17:
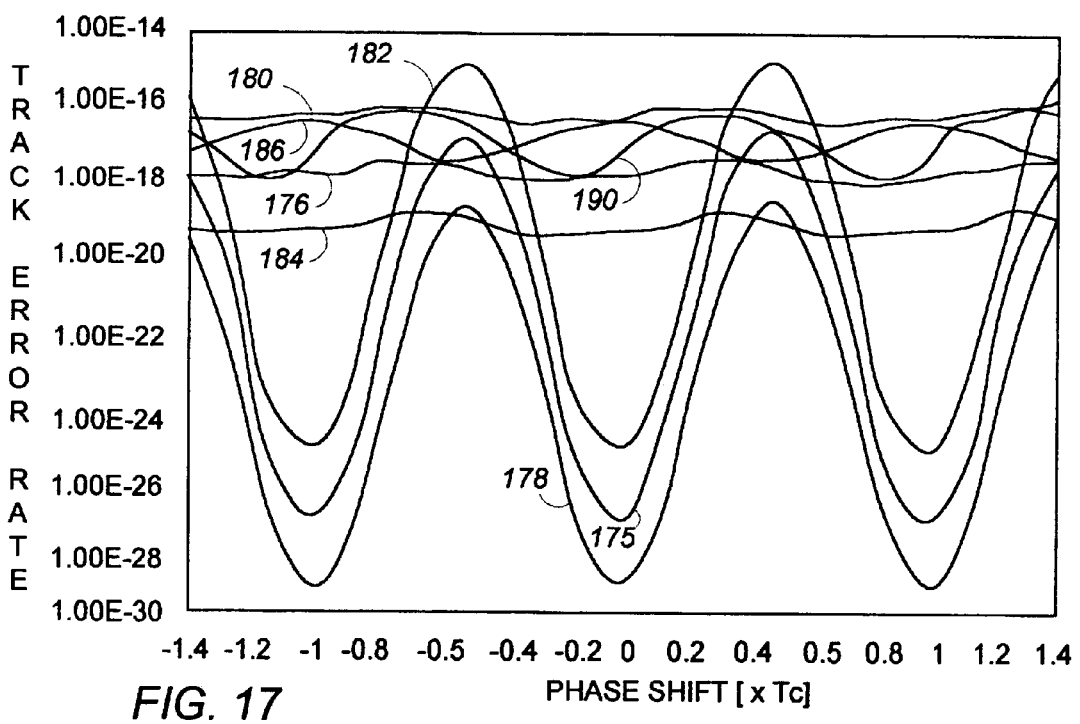
FIG. 17 is a graph of track error rate vs. phase shift, illustrating the influences of DC offset and MR asymmetry.

FIG. 17 is a graph of track error rate vs. phase shift, illustrating the influences of DC offset and MR asymmetry. The waveform of DC offset is made by adding a constant offset to an ideally equalized signal stream. The waveform of MR asymmetry is made by simple linear MR curve approximation. Curve 175 represents the track error rate vs. phase shift for missed SSM with no DC and no asymmetry. Curve 176 represents the track error rate vs. phase shift for false SSM with no DC and no asymmetry. Curve 178 represents the track error rate vs. phase shift for both missed SSM at +20% DC and missed SSM with +20% asymmetry. Curve 180 represents the track error rate vs. phase shift for false SSM at +20% DC. Curve 182 represents the track error rate vs. phase shift for both missed SSM at −20% DC and false SSM with +20% asymmetry. Curve 184 represents the track error rate vs. phase shift for false SSM at −20% DC. Curve 186 represents the track error rate vs. phase shift for false SSM at +20% DC. Almost all DC offset and MR asymmetry are cancelled inside the matched filter. No track error rate (SSM+gray code) degradation is observed on account of the DC offset and the MR asymmetry in the above conditions.

Figure 18:
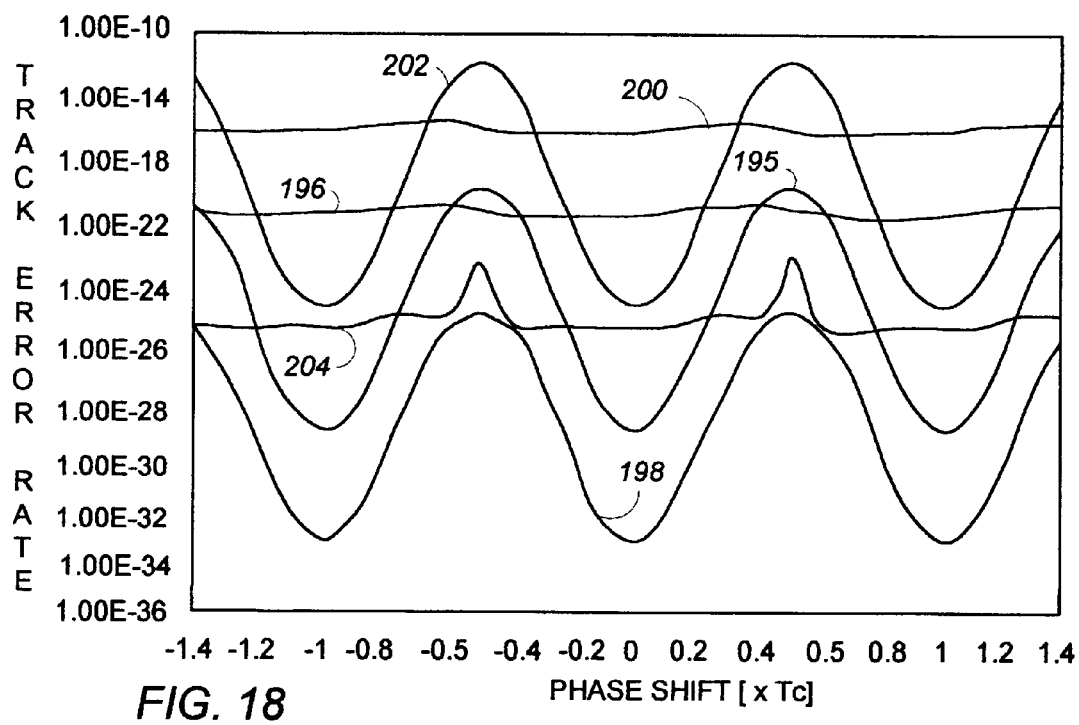
FIG. 18 is a graph of track error rate vs. phase shift, illustrating the influence of signal amplitude variation.

FIG. 18 is a graph of track error rate vs. phase shift, illustrating the influence of signal amplitude variation. Curve 195 represents the track error rate vs. phase shift for missed SSM at (+1,0,−1). Curve 196 represents the track error rate vs. phase shift for false SSM at (+1,0,−1). Curve 198 represents the track error rate vs. phase shift for missed SSM at (+1.1,0,−1.1). Curve 200 represents the track error rate vs. phase shift for false SSM at (+1.1,0,−1.1). Curve 202 represents the track error rate vs. phase shift for missed SSM at (+0.9,0,−0.9). Curve 204 represents the track error rate vs. phase shift for false SSM at (+0.9,0,−0.9). The small signal level (0.9) increases the missed synchronizations and decreases the false synchronizations. The large signal level (1.1) decreases the missed synchronizations and increases the false synchronizations. This is caused by the fixed $V_{th}$. If the $V_{th}$ could be changed according to the signal level, the error rate could be kept constant, but this is not easy to realize. To avoid the signal level dependency, the above-described detector that searches for the largest value of the matched filter output is preferable. The gray code detector has the similar architecture, which degrades the performance by the signal level. In some applications, the 0.9 to 1.1 signal level may be acceptable.

Figure 19:
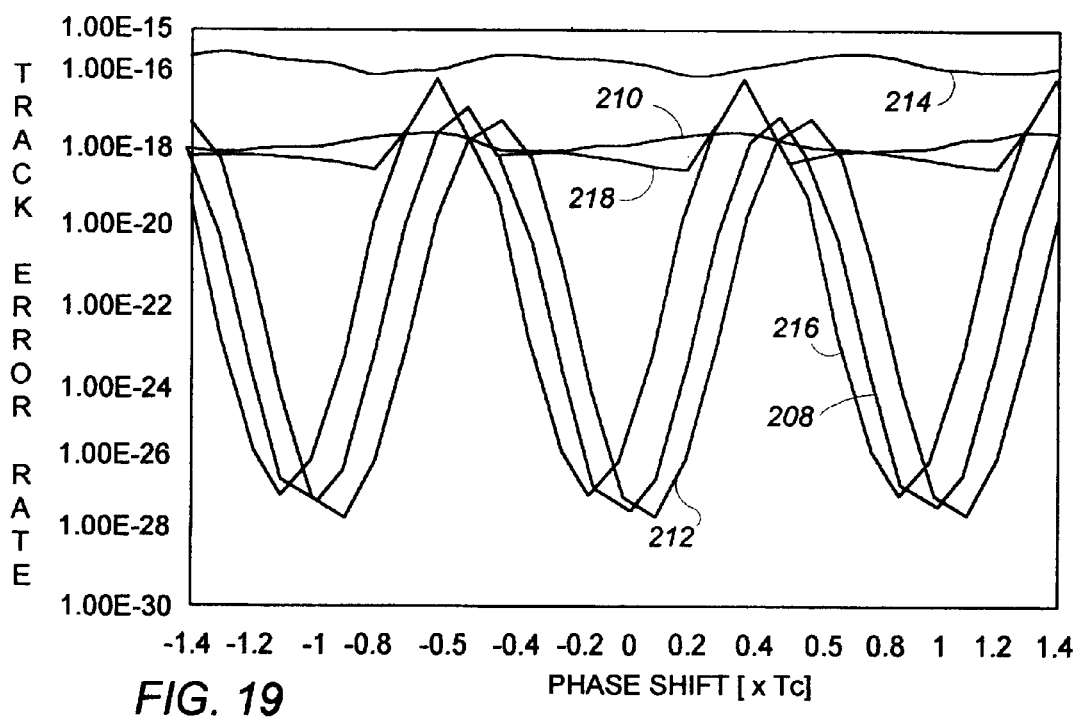
FIG. 19 is a graph of track error rate vs. phase shift, illustrating the influence of frequency offset.

FIG. 19 is a graph of track error rate vs. phase shift, illustrating the influence of the frequency offset. Curve 208 represents the track error rate vs. phase shift for missed SSM at 0% offset. Curve 210 represents the track error rate vs. phase shift for false SSM at 0% offset. Curve 212 represents the track error rate vs. phase shift for missed SSM at +0.5% offset. Curve 214 represents the track error rate vs. phase shift for false SSM at +0.5% offset. Curve 216 represents the track error rate vs. phase shift for missed SSM at 0.5% offset. Curve 218 represents the track error rate vs. phase shift for false SSM at 0.5% offset. The 0.5% frequency offset does not degrade the performance remarkably. The length of the SSM is 30 bits, and the length of the gray code is about 100 bits (6*20=120 bits). The degradation of the gray code must be larger.

Figure 20:
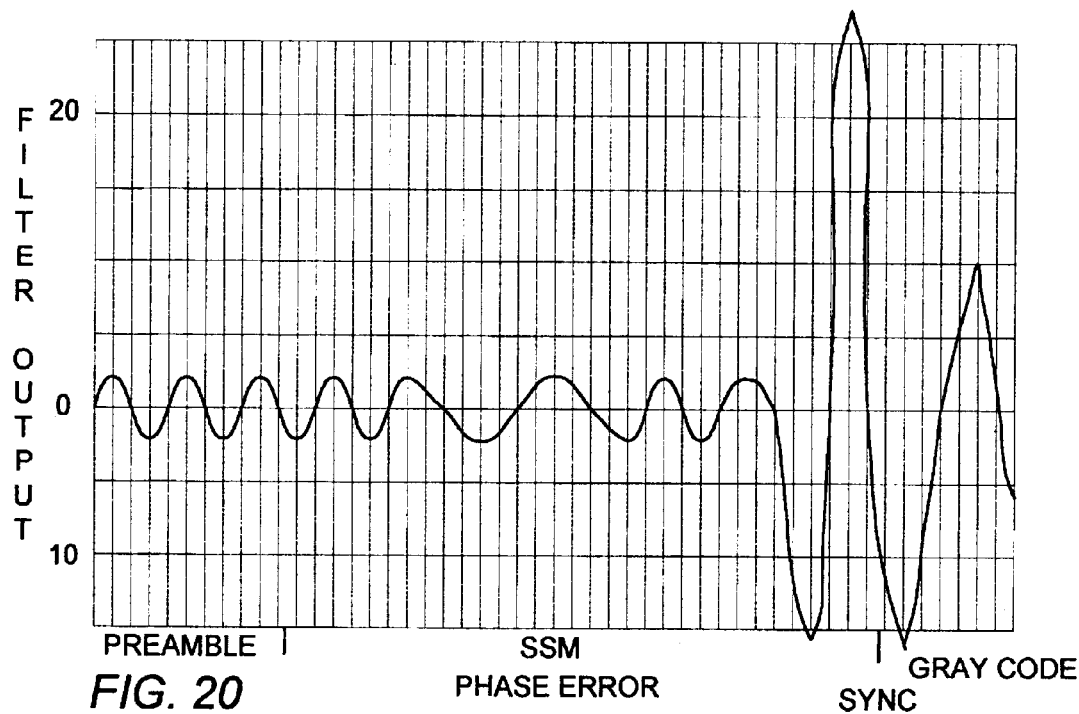
FIG. 20 is a graph of the output of the matched filter vs. phase shift, illustrating the matched filter output of the waveform with large equalization error to observe the influence of the equalization error.

FIG. 20 is a graph of the output of the matched filter vs. phase shift, illustrating the matched filter output of the waveform with large equalization error to observe the influence of the equalization error. The waveform is a Lorentzian pulse at channel density=2.0, without any equalization. (The signal level is adjusted to 1 in the preamble). When compared to FIG. 4, the no equalization error case, this figure shows that the equalization error has a large influence on the design of the matched filter.

Figure 21:
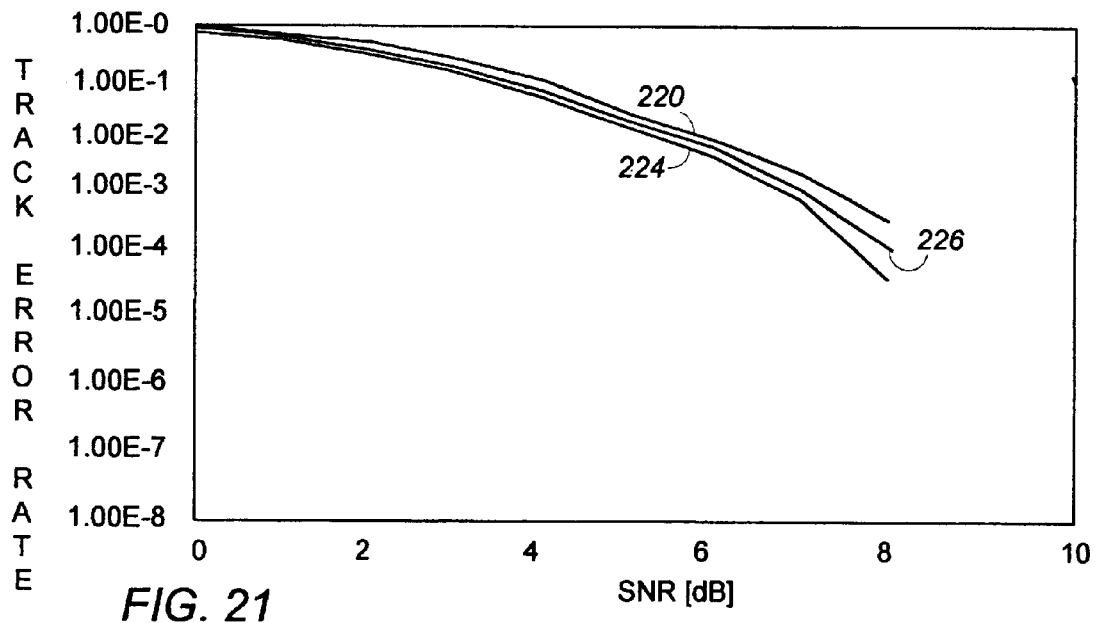
FIG. 21 is a graph of early SSM rate vs. SNR in dB.
Figure 22:
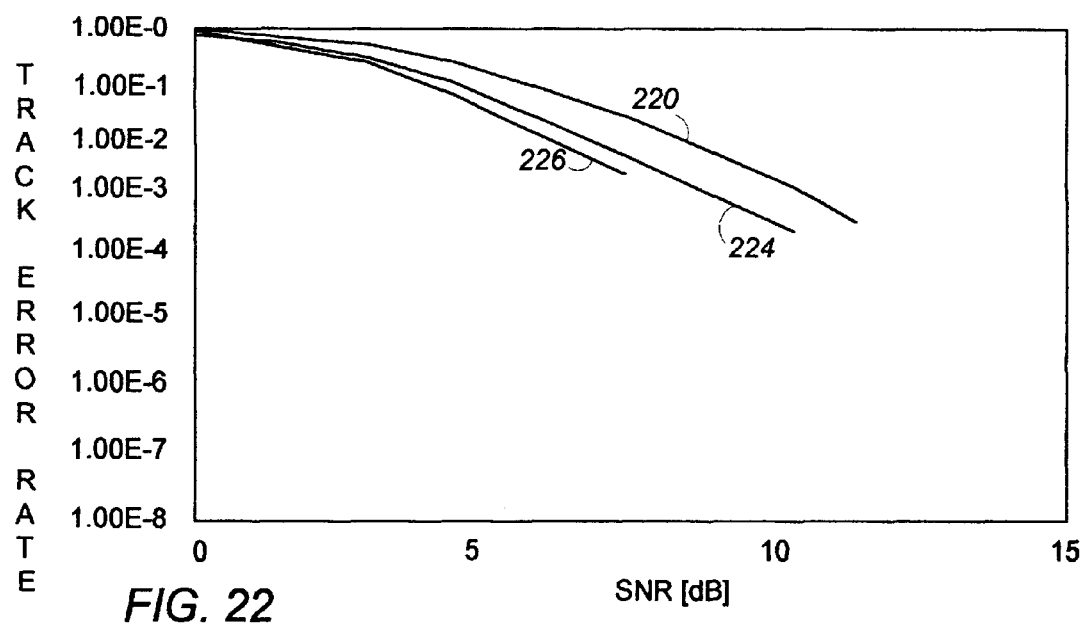
FIG. 22 is a graph of track error rate vs. SNR in dB for a waveform with equalization error.

FIG. 21 is a graph of early SSM rate vs. SNR in dB, and FIG. 22 is a graph of track error rate vs. SNR in dB for a waveform with equalization error. In the Figures, curve 220 represents Eq=1.5, Cd=2.0, which means that an equalizer filter optimized at Cd=1.5 is used for the input waveform of Cd=2.0, which will cause equalization error. Curve 222 represents Eq=2.0, Cd=2.0, which means no equalization error. Curve 226 represents Eq=1.5 and Cd=3.0. FIG. 21 shows the early synchronization error rate. The Eq=1.5, Cd=2.0 and Eq=1.5, Cd=3.0 with equalization error shows better performance than the Eq=2.0, Cd=2.0 without equalization error. This means the equalization error is not worse than the noise boost by the equalizer filter, because the Eq=1.5 filter boosts the noise less than the Eq=2.0 filter. FIG. 22 shows the overall performance of the SSM and ⅙ gray code with equalization error.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A detector for detecting the location of a synchronization mark in a data stream read from a recording medium of a mass data storage device, comprising:

a matched filter arranged to receive selected bit combinations of a received data sequence containing said synchronization mark being shiftable, said matched filter being constructed to produce an output value that is of maximum magnitude when said synchronization mark has just been shifted from a previous next time interval;

and a "D" element for receiving said output value from said matched filter to produce a "D" element output;

wherein when said "D" element output is greater or equal to a predetermined threshold value and is larger than said output value, said synchronization mark is in a current time location, and wherein when said "D" element output is greater or equal to said predetermined threshold value and is less than or equal to said output value, said synchronization mark is in a next time location.

2. The detector of claim 1 wherein said predetermined threshold value is established to be less than said maximum magnitude if a phase of said synchronization mark is within a predetermined phase range.

3. The detector of claim 1 wherein said synchronization mark is 30 bits long.

4. The detector of claim 3 wherein said synchronization mark is NRZI "101010001010101000101000100010".

5. The detector of claim 4 wherein a transfer function of said matched filter is $s_0 = y_0 + y_{-1}\ y_{-4}\ y_{-5} + y_{-8} + y_{-9}\ y_{-10}\ y_{-11} + y_{-14} + y_{-15}\ y_{-16}\ y_{-17} + y_{-18} + y_{-19}\ y_{-20}\ y_{-21} + y_{-24} + y_{-25}\ y_{-26}\ y_{-27} + y_{-28} + y_{-29}$.

6. A detector for detecting the occurrence of a synchronization mark in a data stream, comprising:

an input data delay element for clocking detected data containing said synchronization mark;

an adder for receiving said data containing said synchronization mark and an output of said input data delay element to produce a summed output representing a sum of two consecutive data bits in said data stream;

a chain of data delay elements for clocking said summed output and having a length of two less than a length of said synchronization mark;

a filter connected to receive at least some of said data from said chain of data delay elements said filter producing an output data stream;

an output delay element receiving said output data stream;

and a first comparator for comparing an output of said delay element to a predetermined threshold value to produce a predetermined output state when said output of said output delay element is larger than said predetermined threshold value.

7. The detector of claim 6 wherein said predetermined threshold value of said first comparator is established to be less than said maximum sum if a phase of said synchronization mark is within a predetermined phase range.

8. The detector of claim 6 wherein said filter comprises:

data sign controllers to change signs of selected data in said chain of data holding elements in positions corresponding to negative data in a PR4 form of said synchronization mark to maximize a sum of said summer when said synchronization mark occurs.

9. The detector of claim 6 further comprising a second comparator for comparing said output data stream to said output of said output delay element to produce a first predetermined output state when said output data stream is larger than said output of said output delay element and a second predetermined output state when said output data stream is smaller than said output of said output delay element.

10. The detector of claim 9 wherein when said predetermined output state of said first comparator occurs and said first predetermined output state of said second comparator occurs, said synchronization mark is in a current position; and when said predetermined output state of said first comparator occurs and said second predetermined output state of said second comparator occurs, said synchronization mark is in a next position with respect to said current position.

11. The detector of claim 6 wherein said synchronization mark is 30 bits long.

12. The detector of claim 11 wherein said synchronization mark is NRZI "101010001010101000101000100010".

13. The detector of claim 12 wherein a transfer function of said matched filter is $s_0 = y_0 + y_{-1}\ y_{-4}\ y_{-5} + y_{-8} + y_{-9}\ y_{-10}\ y_{-11} + y_{-14} + y_{-15}\ y_{-16}\ y_{-17} + y_{-18} + y_{-19}\ y_{-20}\ y_{-21} + y_{-24} + y_{-25}\ y_{-26}\ y_{-27} + y_{-28} + y_{-29}$.

14. A method for detecting the location of a synchronization mark in a data stream read from a recording medium of a mass data storage device, comprising:
   applying selected bit combinations of a shifting received data sequence containing said synchronization mark to a matched filter that produces an output value that is of maximum magnitude when said synchronization mark has just shifted thereby;
   delaying said output value for one time period to produce a delayed value;
   wherein when said delayed value is greater or equal to a predetermined threshold value and is larger than said output value, said synchronization mark is in a current time location, and
   wherein when said delayed value is greater or equal to said predetermined threshold value and is less than or equal to said output value, said synchronization mark is in a next time location with respect to current time position.

15. The method of claim 14 further comprising establishing said predetermined threshold value to be less than maximum magnitude if a phase of said synchronization mark is within a predetermined phase range.

16. The method of claim 14 wherein said synchronization mark is 30 bits long.

17. The method of claim 16 wherein said synchronization mark is NRZI "101010001010101000101000100010".

18. The method of claim 17 wherein a transfer function of said matched filter is $s_0 = y_0 + y_{-1}\ y_{-4}\ y_{-5} + y_{-8} + y_{-9}\ y_{-10}\ y_{-11} + y_{-14} + y_{-15}\ y_{-16}\ y_{-17} + y_{-18} + y_{-19}\ y_{-20}\ y_{-21} + y_{-24} + y_{-25}\ y_{-26}\ y_{-27} + y_{-28} + y_{-29}$.

19. A mass data storage device, comprising:
   a data medium containing a synchronization mark contained thereon;
   a data transducer arranged to read data from said data medium, including said synchronization mark, to produce a data stream;
   a matched filter arranged to receive selected bit combinations of said data stream, said matched filter being constructed to produce an output value that is of maximum magnitude when said synchronization mark has just shifted thereby in a next preceding time interval;
   and a "D" delay element for receiving said output value from said matched filter to produce a "D" element output;
   wherein when said "D" element output is greater or equal to a predetermined threshold value and is larger than said output value, said synchronization mark is in a current time location, and
   wherein when said "D" element output is greater or equal to said predetermined threshold value and is less than or equal to said output value, said synchronization mark is in a next time location with respect to said currently time location.

20. The mass data storage device of claim 19 wherein said predetermined threshold value is established to be less than said maximum magnitude if a phase of said synchronization mark is within a predetermined phase range.

21. The mass data storage device of claim 19 wherein synchronization mark is 30 bits long.

22. The mass data storage device of claim 21 wherein said synchronization mark is NRZI "101010001010101000101000100010".

23. The mass data storage device of claim 22 wherein a transfer function of said matched filter is $s_0 = y_0 + y_{-1}\ y_{-4}\ y_{-5} + y_{-8} + y_{-9}\ y_{-10}\ y_{-11} + y_{-14} + y_{-15}\ y_{-16}\ y_{-17} + y_{-18} + y_{-19}\ y_{-20}\ y_{-21} + y_{-24} + y_{-25}\ y_{-26}\ y_{-27} + y_{-28} + y_{-29}$.

24. A detector for detecting the occurrence of a synchronization mark in a data stream, comprising:
   a chain of data holding elements having a length as long as said synchronization mark and to clock detected data containing said synchronization mark;
   a filter connected to receive at least some of said data in said data stream from said holding elements;
   said filter being configured to produce a maximum output when a desired synchronization mark is contained in said chain;
   and a comparator for receiving said output to produce an output state when said sum is larger than a predetermined threshold value.

25. The detector of claim 24 wherein said predetermined threshold value is established to be less than said maximum sum if a phase of said synchronization mark is within a predetermined phase range.

26. The detector of claim 24 wherein a first location of said synchronization mark beyond said predetermined threshold value is detected.

27. The detector of claim 24 wherein said filter comprises:
   data sign controllers to change signs of selected data in said chain of data holding elements in positions corresponding to negative data in a PR4 form of said synchronization mark to maximize a sum of said summer when said synchronization mark occurs.

28. The detector of claim 24 wherein said synchronization mark is 30 bits long.

29. The detector of claim 28 wherein said synchronization mark is NRZI "101010001010101000101000100010".

30. A detector for detecting the occurrence of a synchronization mark in a data stream, comprising:
   means for filtering a number of consecutive data bits in said data stream corresponding to a length of said synchronization mark to produce a filter output;
   and means for comparing a magnitude of said filter output to a predetermined threshold value to produce an output state when said magnitude exceeds said predetermined threshold value, said output state indicating the occurrence of said synchronization mark.

31. The detector of claim 30 further comprising means for establishing said predetermined threshold value to be less than a maximum magnitude of said filter output if a phase of said synchronization servo mark is within a predetermined phase range.

32. The detector of claim 30 further comprising means for changing signs of selected data in said data stream in positions corresponding to negative data in a PR4 form of said synchronization mark to maximize the output of said filter when said synchronization mark occurs.

33. The detector of claim 30 wherein said synchronization mark is 30 bits long.

34. The detector of claim 30 wherein said synchronization mark is NRZI "101010001010101000101000100010".

35. A method for detecting the occurrence of a synchronization mark in a data stream, comprising:

filtering a number of consecutive data bits in said data stream, said number corresponding to a length of said synchronization mark to produce a filter output;

and comparing a magnitude of said filter output to a predetermined threshold value to produce an output state when said magnitude exceeds said predetermined threshold value, said output state indicating the occurrence of said synchronization mark.

36. The method of claim 35 further comprising establishing said predetermined threshold value to be less than a maximum sum if a phase of said synchronization servo mark is within a predetermined phase range.

37. The method of claim 35 further comprising changing signs of selected data in said data stream in positions corresponding to negative data in a PR4 form of said synchronization mark to maximize said output of said filter when said synchronization mark occurs.

38. The method of claim 35 wherein said synchronization mark is 30 bits long.

39. The method of claim 35 wherein said synchronization mark is NRZI "101010001010101000101000100010".

40. A mass data storage device, comprising:

a data medium containing a synchronization mark contained thereon;

a data transducer arranged to read data from said data medium, including said synchronization mark, to produce a data stream;

a detector for detecting the occurrence of a synchronization mark in said data stream, said detector including:
a chain of data holding elements having a length as long as said synchronization mark and for clocking data containing said synchronization mark;
a filter connected to receive at least some of said data in said data stream from said holding elements;
said filter being configured to produce a maximum output when a desired synchronization mark is contained in said chain;
and a comparator for receiving said output to produce an output state when said sum is larger than a predetermined threshold value.

* * * * *